United States Patent [19]

Agranov

[11] Patent Number: 4,641,440
[45] Date of Patent: Feb. 10, 1987

[54] MAP HOLDER

[76] Inventor: Vladimir Agranov, 6036 Richmond Hwy. #204, Alexandria, Va. 22303

[21] Appl. No.: 729,064

[22] Filed: Apr. 30, 1985

[51] Int. Cl.⁴ ................................................ G09F 3/18
[52] U.S. Cl. ..................................... 40/10 A; 40/110; 434/153
[58] Field of Search ..................... 40/10 A, 10 R, 110; 434/153; 224/277

[56] References Cited

U.S. PATENT DOCUMENTS

| 1,537,899 | 5/1925 | Stubbs | 40/10 A |
| 1,710,555 | 4/1929 | Tascarella | 40/10 A |
| 1,773,337 | 8/1930 | Barlow | 40/10 A |
| 1,930,307 | 10/1933 | Croes | 40/10 A |
| 2,729,908 | 1/1956 | Miller | 40/10 A |
| 4,071,174 | 1/1978 | Weiner | 224/277 |
| 4,443,198 | 4/1984 | Hsanipour | 434/153 |

Primary Examiner—Gene Mancene
Assistant Examiner—Wenceslao J. Contreras

[57] ABSTRACT

A map holder for automotive vehicles comprising a transparent cover and a bottom plate adapted to receive a map therebetween. A telescopic pointer is slidably and pivotally secured on the bar which is mounted on the bottom plate. This arrangement allows tracing a route and pinpointing the actual location of the vehicle on the map. A non-permanent marker is used to apply a route on the transparent cover. After the desired destination is reached, the marking on the transparent cover is erased by a soft paper tissue or the like.

4 Claims, 4 Drawing Figures

MAP HOLDER

FIELD OF THE INVENTION

This invention relates to a map holder for road vehicles or the like, and more particularly to a map holder provided with a present location indicator which allows to follow the route while driving a car.

BACKGROUND OF THE INVENTION

In the past, various types of map holders have been provided with absolutely no means for accurately showing the point of one's present location at the moment while driving a car.

If the map is marked with a writing tool in order to eliminate the problem described above, this makes it difficult to use the map later. For example, the maps having highlighted routes, as those provided by Travel Clubs, may be used only for those routes as intended by highlighting. Prior art solutions were often cumbersome and inconvenient to use.

The following prior art is known to the applicant:
U.S. Pat. No. 1,710,555: Tascarella
U.S. Pat. No. 2,787,070: Idoine
U.S. Pat. No. 3,925,918: Pelin
U.S. Pat. No. 4,071,174: Weiner
U.S. Pat. No. 4,477,254: Yokayama All these references were issued in class 40 of the US classification of inventions. Tascarella's map holder is the closest by its inventive concept to this invention, however it does not permit a full visibility of the route; its slide member covers the map, and its pointer can move in only one axis at a time. Other prior art devices are cumbersome and inconvenient to use and lack the means for accurately showing the point of one's actual location. Determining present whereabouts using these devices was quite troublesome.

SUMMARY OF THE INVENTION

The present invention is intended to obviate the above described disadvanatages of the prior art.

Another object of the invention is to provide a map holder which allows tracing a route or directions, pinpointing the actual location of the vehicle on the map, and erasing the traced route after the desired destination is reached.

It is another object of the present invention to provide a map holder that is able to indicate the present position simply and quickly in any section of the map.

A still further object is to provide a holder for maps having a transparent covering member, said holder being adapted to be attached to a member inside the vehicle.

It is yet another object to provide a map holder wherein a telescopic pointer is slidably and pivotally affixed to an element secured to said holder.

A still further object is to provide a holder for maps wherein a pointer may be moved longitudinally, transversely and arcuately with respect to the holder, thus being able to indicate any desired point on the map carried by the holder.

In order to accomodate different types of vehicles and driver attitudes, I prefer to use as the support means a clip with a hinge, although strips of commercially available VELCRO could also be used depending on the design of the front panel of the automobile.

BRIEF DESCRIPTION OF THE DRAWINGS

The above and other features of my invention will now be described in detail with reference to the accompanying drawings in which.

DETAILED DESCRIPTION OF THE INVENTION

Figure 1:
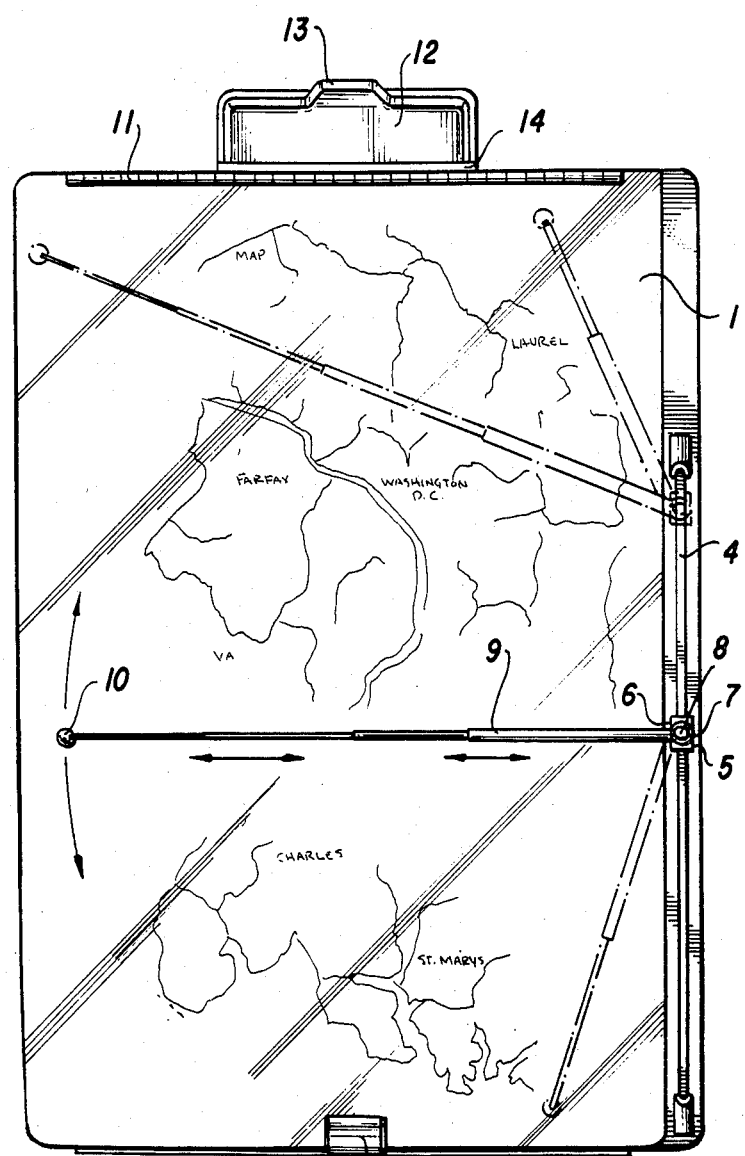
FIG. 1 is a plan view of a map holder according to my invention.

Referring more particularly to the drawings, following is a description of a map holder in accordance with the teachings of the present invention. FIG. 1 shows a general view of my map holder comprising a bottom plate 2, which is made preferably of a plastic material, although any other light material may be used, a transparent cover 1 made of a translucent plastic material which is hingedly affixed to the bottom plate 2, and a sliding mechanism 5.

Figure 2:
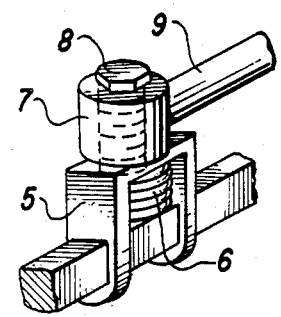
FIG. 2 is an enlarged view of the sliding mechanism carrying a pivoted telescopic pointer.
Figure 3:
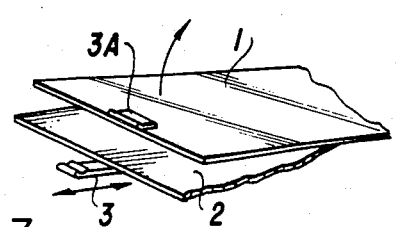
FIG. 3 is a schematic view illustrating a function of a latch which holds a transparent cover.

The sliding mechanism 5 shown in detail in FIG. 2 carries a pivotally mounted telescopic tube 9 with a pointer 10 at the end. The telescopic tube 9 is rigidly affixed to a sleeve 7 pivotally mounted on the sliding member 5 by means of a fastening member 8. Snug connection of the sleeve 7 on the sliding member 5 is achieved through the use of a coil spring 6. This arrangement prevents loose and uncontrollable rotation of the sleeve 7 around the fastener 8 on the sliding member 5.

The sliding unit 5 is slidingly mounted on a bar 4. Although the bar 4 is shown of a rectangular cross-section, other shapes may also be used within the scope of this invention. The bar 4 is fixedly mounted at the edge of the bottom plate 2. The length of the bar is not essential but it should be sufficient for the sliding member to be able to cover such a length that the telescopic pointer would reach every distant corner of the map during its manipulation.

The telescopic tube 9 pivots around the axis 8 above the surface of the transparent cover 1 thereby covering the entire surface of the cover. The pointer 10 is extended from the telescopic tube 9, and owing to the pivotal mount of the tube 9, it may describe an arc on the surface of the cover 1.

Combination of the sliding movement of the sliding unit 5, pivotal movement of the telescopic tube 9, and extendable pointer 10 allows said pointer to reach every point on the cover 1 without blocking or covering any part of the map placed beneath the cover 1.

Figure 4:
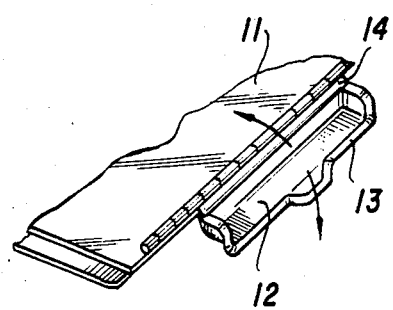
FIG. 4 is an enlarged view illustrating details of the clip for mounting my holder in an automobile.

The transparent cover 1 is hingedly mounted to the bottom plate 2 by the hinge 11. FIG. 4 illustrates the hinge 11 and related elements. The hinge also carries a spring loaded clip 13 which serves the purpose of mounting the map holder inside the automobile. The clip 13 cooperates with a rubber plate 12. The holder may be clipped to practically any protruding member conveniently located in front of a motorist. In some cars front panel elements do not protrude enough for the holder to be clipped thereto; in such cases two strips of commercially available VELCRO may be used.

After a map is placed between the transparent cover 1 and the bottom plate 2, a sliding clip 3 holds down the cover 1 to the bottom plate 2 and retains them closed by engaging a stop 3a carried by the cover 1. The sliding clip is bent in such a shape as to exert a spring action upon the stop 3a. This arrangement makes it possible to accomodate in the holder any commercially available maps or atlases with the desired portion exposed through the transparent cover.

A map holder thus described is used as follows:

A map of a certain region is placed between the bottom plate 2 and the transparent cover 1, and the cover is closed and held down by the sliding clip 3. Then a desired route from point A to point B is applied to the transparent cover 1 with a non-permanent marker commercially available at good office supply stores. Now, a vehicle operator can follow thus highlightes route by manipulating the pointer 10 along the marked directions. He can pinpoint his actual location on the map in relation to the streets he passed on his way to point B.

After the desired destination is reached, the marking on the transparent cover can be easily removed by a soft paper tissue, napkin or the like. The map holder is ready for a new route.

While the invention has been disclosed in a preferred form, it should be understood that the specific embodiment thereof as described and illustrated herein is not be considered in a limited sense, as there may well be other forms or modifications of the present invention which should be constructed to come within the scope of the appended claims.

I claim:

1. A map holder, comprising
   a bottom plate arranged to support a map and having two first sides spaced from one another and two second sides spaced from one another and extending transversely to said first sides, said bottom plate having also a predetermined plane;
   an elongated pointing element having a pointing end and a connecting end spaced from one another in a direction of elongation of said pointing element, said pointing element being pivotable substantially in said plane of said bottom plate and about said connecting end so that during said pivoting of said pointing element said pointing end moves over a circumference with a center at said connecting end, said pointing element being also telescopically extendable and retractable in the direction of elongation of said pointing element from and toward said connecting end and radially of said circumference so that during said telescopical extension and retraction of said pointing element said pointing end moves over a radius of said circumference, whereby by said pivoting of said pivoting element about a center located at said connecting end and by said telescopic extension and retraction of said pivoting element from and toward said connecting end said pointing end of said pointing element can reach and point to any point on a map supported by said bottom plate; and
   means for connecting said connecting end of said pointing element pivotally with said bottom plate.

2. A map holder as defined in claim 1, wherein said connecting end of said pointing element is slidable along one of said first sides of said bottom plate so that said pointing end also moves longitudinally parallel to said one first side of said bottom plate, said connecting means being formed so as to allow said sliding of said connecting end of said pointing element.

3. A map holder as defined in claim 2; and further comprising a transparent cover; and means for connecting said transparent cover with said bottom plate turnably between a covering position in which said transparent cover is located close to said bottom plate to cover a map therebetween, and an opening position in which said transparent cover is withdrawn from said bottom plate.

4. A map holder as defined in claim 1; and further comprising means for attaching said bottom plate to a member inside a vehicle.

* * * * *